(12) United States Patent
Shchemelinin et al.

(10) Patent No.: US 10,139,283 B2
(45) Date of Patent: Nov. 27, 2018

(54) NON-CONTACT THERMAL MEASUREMENTS OF VUV OPTICS

(71) Applicant: KLA-Tencor Corporation, Milpitas, CA (US)

(72) Inventors: Anatoly Shchemelinin, Bozeman, MT (US); Ilya Bezel, Mountain View, CA (US); Kenneth P. Gross, San Carlos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/360,722

(22) Filed: Nov. 23, 2016

(65) Prior Publication Data

US 2017/0153145 A1 Jun. 1, 2017

Related U.S. Application Data

(60) Provisional application No. 62/261,292, filed on Nov. 30, 2015.

(51) Int. Cl.
| | |
|---|---|
| *G01J 5/00* | (2006.01) |
| *G01J 5/10* | (2006.01) |
| *G01J 5/52* | (2006.01) |

(52) U.S. Cl.
CPC .............. *G01J 5/10* (2013.01); *G01J 5/0003* (2013.01); *G01J 5/524* (2013.01); *G01J 2005/0077* (2013.01); *G01J 2005/103* (2013.01)

(58) Field of Classification Search
CPC .................... G01J 5/10; G01J 5/08; G01J 5/48
(Continued)

(56) References Cited

U.S. PATENT DOCUMENTS

| 5,683,181 A | 11/1997 | Shepard |
| 8,148,900 B1 | 4/2012 | Kirk et al. |

(Continued)

OTHER PUBLICATIONS

International Search Report dated Feb. 14, 2017, for PCT Application No. PCT/US2016/063939 filed on Nov. 29, 2016 by KLA-Tencor Corporation, 3 pages.

*Primary Examiner* — David Porta
*Assistant Examiner* — Meenakshi Sahu
(74) *Attorney, Agent, or Firm* — Spano Law Group; Joseph S. Spano

(57) ABSTRACT

Methods and systems for performing non-contact temperature measurements of optical elements with long wavelength infrared light are described herein. The optical elements under measurement exhibit low emissivity to long wavelength infrared light and are often highly reflective or highly transmissive to long wavelength infrared light. In one aspect, a material coating having high emissivity, low reflectivity, and low transmission at long wavelength IR wavelengths is disposed over selected portions of one or more optical elements of a metrology or inspection system. The locations of the material coating are outside the direct optical path of the primary measurement light employed by the metrology or inspection system to perform measurements of a specimen. Temperature measurements of the front and back surfaces of an IR-transparent optical element are performed with a single IR camera. Temperature measurements are performed through multiple optical elements in an optical path of a primary measurement beam.

20 Claims, 6 Drawing Sheets

(58) Field of Classification Search
USPC .................................................. 250/338.1
See application file for complete search history.

(56) References Cited

U.S. PATENT DOCUMENTS

| | | | |
|---|---|---|---|
| 8,698,399 B2* | 4/2014 | Bezel | G21B 1/23 |
| | | | 315/111.21 |
| 2005/0052643 A1 | 3/2005 | Lange | |
| 2005/0254050 A1 | 11/2005 | Fielden et al. | |
| 2008/0224044 A1 | 9/2008 | Semprimoschnig et al. | |

* cited by examiner

NON-CONTACT THERMAL MEASUREMENTS OF VUV OPTICS

CROSS REFERENCE TO RELATED APPLICATION

The present application for patent claims priority under 35 U.S.C. § 119 from U.S. provisional patent application Ser. No. 62/261,292, entitled "Non Contact Temperature Measurements for VUV Optic Components," filed Nov. 30, 2015, the subject matter of which is incorporated herein by reference.

TECHNICAL FIELD

The described embodiments relate to optical metrology and inspection systems for microscopy, and more particularly to optical metrology and inspection systems involving illumination sources and optical systems operating at vacuum ultraviolet wavelengths.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Inspection and metrology processes are used at various steps during a semiconductor manufacturing process to detect defects on wafers to promote higher yield.

Optical metrology techniques offer the potential for high throughput without the risk of sample destruction. A number of optical metrology based techniques including scatterometry and reflectometry implementations and associated analysis algorithms are commonly used to characterize critical dimensions, film thicknesses, composition, overlay and other parameters of nanoscale structures. To perform high throughput measurements of modern semiconductor structures, including high aspect ratio structures, a wide range of illumination wavelengths must be employed, ranging from vacuum ultraviolet (VUV) wavelengths through infrared (IR) wavelengths.

Similarly, when inspecting specular or quasi-specular surfaces such as semiconductor wafers bright field (BF) and dark field (DF) modalities may be used, both to perform patterned wafer inspection and defect review. In BF inspection systems, collection optics are positioned such that the collection optics capture a substantial portion of the light specularly reflected by the surface under inspection. In DF inspection systems, the collection optics are positioned out of the path of the specularly reflected light such that the collection optics capture light scattered by objects on the surface being inspected such as microcircuit patterns or contaminants on the surfaces of wafers. Viable inspection systems, particularly BF inspection systems, require high radiance illumination and a high numerical aperture (NA) to maximize the defect sensitivity of the system.

Current wafer inspection and metrology systems typically employ a broad range of illumination sources including VUV sources, such as laser sustained plasmas. Laser sustained plasmas are produced in high pressure bulbs surrounded by a working gas at lower temperature than the laser plasma. Substantial radiance improvements are obtained with laser sustained plasmas. Atomic and ionic emission in these plasmas generates wavelengths in all spectral regions, including shorter than 200 nm when using either continuous wavelength or pulsed pump sources. Excimer emission can also be arranged in laser sustained plasmas for wavelength emission at 171 nm (e.g., xenon excimer emission). Hence, a simple gas mixture in a high pressure bulb is able to sustain wavelength coverage at deep ultraviolet (DUV) wavelengths with sufficient radiance and average power to support high throughput, high resolution BF wafer inspection, for example.

The availability of high power illumination sources places a significant burden on the optical components employed to collect and focus the high power radiation onto the specimen under measurement. Contamination and absorption issues can lead to failure of optical components. Monitoring the thermal characteristics of optical components in modern metrology and inspection systems becomes critical to ensure tool performance and reliability.

In some examples, temperature is measured by sensors (e.g., a thermocouple) placed in mechanical contact with an optical component. Contact temperature measurements are simple to implement in some situations, but contact thermal measurements have a number of significant limitations. For example, mechanically attaching a sensor directly to an optical element can be very difficult and can potentially damage the optic itself. Even if attached to the optical element, it may show incorrect temperature due to poor thermal conductivity of the optical element. The thermocouple wire itself has relatively high thermal conductivity and may change the temperature of the contact point. In addition, the contact sensor can absorb and scatter light in the system. Thus, the physical presence of the contact sensor changes the temperature at the point of contact and the temperature of the optical system as well. In many situations, installation of the contact sensors is impossible inside sensitive optical systems due to cleanliness requirements, optical alignment sensitivity, etc. These problems manifest themselves in VUV systems, among others. Contact thermal measurements only measure the temperature at the point of contact. Often, this is not the optical component itself but an optical mount with a very different temperature from the optical component of interest. Typically, temperature measurements at one or two points at the periphery of an optical element do not provide enough information to recreate the complete temperature distribution of interest. Generally, an accurate estimate of the total temperature distribution or the peak temperature at the center of optic field is preferred.

In some other examples, temperature is measured by thermal imaging. Thermal imaging does not require locating sensors onto the optical element. Thus, in many applications, thermal imaging of optical components is preferred. Typically, thermal imaging based temperature measurements are performed by imaging a target object with one or more calibrated IR cameras. However, thermal imaging based temperature measurements also suffer from significant limitations. For example, thermal cameras are expensive and require significant integration effort to achieve accurate results. In addition, thermal based temperature measurements require an unobscured view of the measured object, and this is difficult or impossible to achieve in many optical systems. Also, in many cases, the optical components themselves either transmit or reflect IR, and for that reason they are invisible to the IR cameras. This is the case for VUV optical components that include VUV transparent materials such as Magnesium Fluoride, Calcium Fluoride, and Lithium Fluoride, and VUV reflective materials such as metal mirrors.

In summary, ongoing reductions in feature size and increasing depths of structural features impose difficult requirements on optical metrology systems. Optical metrology systems must meet high precision and accuracy requirements for increasingly complex targets at high throughput to remain cost effective. In this context, high power optical systems must be employed and it becomes increasingly important to monitor the thermal characteristics of optical components during operation. In many examples, it has not been possible to perform these measurements. Thus, improved systems and methods to overcome these limitations are desired.

SUMMARY

Methods and systems for performing non-contact temperature measurements of optical elements with long wavelength infrared light (e.g., 8-15 micrometers) are described herein. The optical elements under measurement exhibit low emissivity to long wavelength infrared light, and are often highly reflective or highly transmissive to long wavelength infrared light.

In one aspect, a material coating having high emissivity, low reflectivity, and low transmission at long wavelength IR wavelengths is disposed over selected portions of one or more optical elements of a metrology or inspection system. The locations of the material coating are outside the direct optical path of the primary measurement light employed by the metrology or inspection system to perform measurements of a specimen. By coating the optical element with an IR emissive material over an area that lies outside the direct optical path of the primary measurement light, interaction between the primary measurement light and the IR emissive material is reduced.

In some embodiments, the optical element subject to temperature measurement is transparent to IR. In these embodiments a portion of the IR-transparent optical component is coated with an IR emissive material to enable thermal imaging. In some other embodiments, the optical element is reflective to IR. In these embodiments a portion of the IR-reflective optical component is coated with an IR emissive material to enable thermal imaging.

In some other embodiments, a material having high emissivity to long IR wavelengths is located at the center of an optical element to enable thermal imaging of optical element when the optics system includes an obscuration that directs the primary measurement light away from the central portion of the optical element.

In a further aspect, IR imaging based temperature measurements of the front and back surfaces of an IR-transparent optical element are performed with a single IR camera.

In another further aspect, IR imaging based temperature measurements of an optical element are performed through another optical element in the optical system. If the optical components are transparent or reflective to IR illumination, measurements can be performed through multiple optical elements in an optical path of a primary measurement beam, provided the measurement spots coated with IR emissive material do not obscure one another in the field of view of the IR camera.

In another further aspect, the effect of parasitic heating of the IR emissive material from secondary reflections is removed by adjusting the measured temperature. In another further aspect, the shape of one or more optical elements and the locations of the IR emissive material coating on an optical element is optimized to minimize the amount of stray primary measurement light incident on the IR emissive material coatings.

In another further aspect, the temperature distribution of one or more optical elements imaged by an IR camera is estimated based on the collected thermal images.

In another further aspect, the total amount of primary measurement light absorbed by each optical element imaged by an IR camera is estimated based on the collected thermal images.

In another further aspect, the transmission efficiency of each optical element imaged by an IR camera is estimated based on the collected thermal images.

In another further aspect, the magnitude of damage to each optical element imaged by an IR camera is estimated based on the collected thermal images.

In another further aspect, the intensity of the primary illumination light is estimated based on the collected thermal images of one or more optical elements in the optical path of the primary illumination light.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for performing non-contact temperature measurements of optical elements with long wavelength infrared light (e.g., 8-15 micrometers) are described herein. The optical elements under measurement exhibit low emissivity to long wavelength infrared light, and are often highly reflective or highly transmissive to long wavelength infrared light. For these reasons, IR based temperature measurements of these optical components are difficult, or impossible.

In one aspect, a material coating having high emissivity, low reflectivity, and low transmission at long wavelength IR wavelengths is disposed over selected portions of one or more optical elements of a metrology or inspection system. The locations of the material coating are outside the direct optical path of the primary measurement light employed by the metrology or inspection system to perform measurements of a specimen. By coating the optical element with an IR emissive material over an area that lies outside the direct optical path of the primary measurement light, interaction between the primary measurement light and the IR emissive material is reduced.

Figure 1:
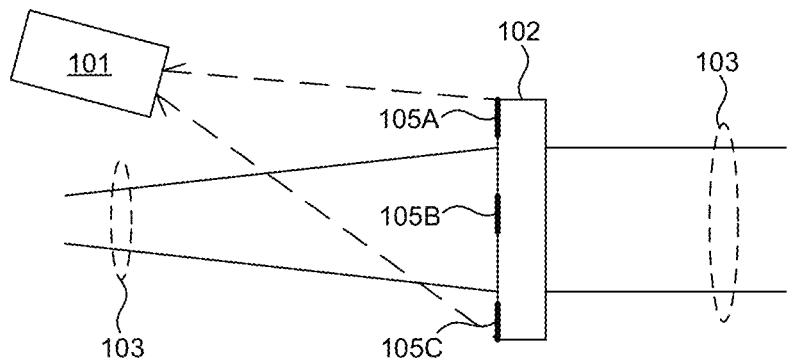
FIG. 1 is a simplified diagram illustrative of an optical lens element coated with a material having high emissivity at long IR wavelengths over multiple areas that are located the direct optical path of primary measurement light passing through the optical element.

FIG. 1 depicts an optical lens element 102 coated with a material having high emissivity at long wavelength IR wavelengths over areas 105A-D (area 105D is hidden in FIG. 1). Areas 105A-D are located outside the direct optical path of primary measurement light 103 passing through optical element 102. As depicted in FIG. 1, areas 105A-D are positioned within the field of view of IR camera 101. Thus, thermal images collected by IR camera 101 include the temperatures of areas 105A-D.

Figure 2:
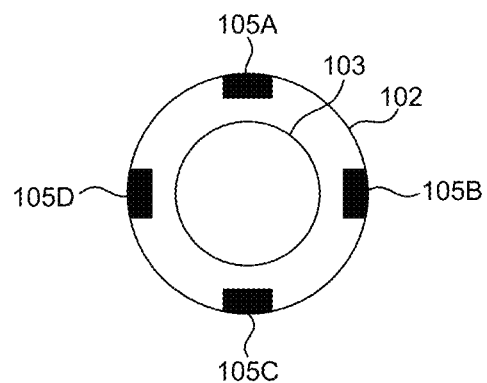
FIG. 2 is a simplified diagram illustrative of the locations of the multiple coated areas depicted in FIG. 1 that are visible in the field of view of an IR camera in one embodiment.

FIG. 2 illustrates the locations of areas 105A-D in the field of view of IR camera 101. In addition, the perimeter of optical element 102 and the projection of primary measurement light 103 onto optical element 102 are also illustrated. As depicted in FIG. 2, area 105A-D are located on the face of optical element 102, but outside the direct optical path of primary measurement light 103. Although four discrete area segments are illustrated in FIG. 2, in general, any number of different area segments, or the entire area outside the direct optical path of primary measurement light 103 may be coated with a material having high emissivity at long IR wavelengths.

Figure 3:
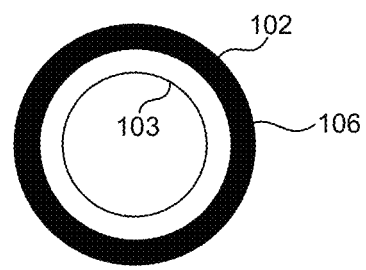
FIG. 3 is a simplified diagram illustrative of the locations of multiple coated areas in the field of view of an IR camera in another embodiment.

FIG. 3 illustrates the location of an area 106 coated with a material having high emissivity at long IR wavelengths in another embodiment. The perimeter of optical element 102 and the projection of primary measurement light 103 onto optical element 102 are also illustrated. As depicted in FIG. 3, area 106 is located on the face of optical element 102, but outside the direct optical path of primary measurement light 103. In this embodiment, the IR emissive material is located around the entire periphery of the optical element. In this embodiment, the thermal images collected by IR camera 101 include a rich set of temperature values that may be used to predict the complete temperature distribution of the entire optical element 102.

In some embodiments, optical element 102 is transparent to IR (e.g., a lens of a VUV optical system). In these embodiments a portion of the IR-transparent optical component is coated with an IR emissive material to enable thermal imaging. In one example, an oxide coating is disposed on the VUV lens.

In some other embodiments, the optical element is reflective to IR (e.g., a mirror of a VUV optical system). In these embodiments a portion of the IR-reflective optical component is coated with an IR emissive material to enable thermal imaging. In one example, an oxide coating is disposed on a VUV metal mirror (e.g., an aluminum or platinum mirror).

In some other embodiments, a material having high emissivity to long IR wavelengths is located at the center of an optical element. These embodiments are suitable when the metrology system includes an obscuration that directs the primary measurement light away from the central portion of the optical element (e.g., near a pupil plane of a metrology system that employs obscuration). In these embodiments, temperature measurements of the central portion of an optical element are performed based on images collected by an IR camera.

Figure 4:
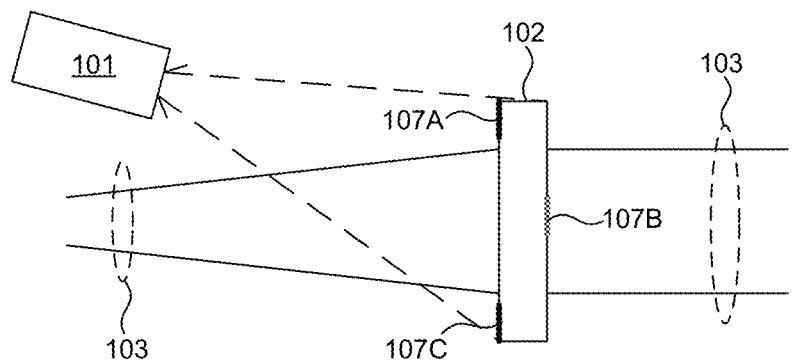
FIG. 4 is a simplified diagram illustrative of an optical lens element coated with a material having high emissivity at long IR wavelengths over multiple areas on the front surface of the optical element and multiple areas on the back surface of the optical element.

In a further aspect, IR imaging based temperature measurements of the front and back surfaces of an IR-transparent optical element are performed with a single IR camera. FIG. 4 depicts optical lens element 102 coated with a material having high emissivity at long wavelength IR wavelengths over areas 107A and 107C on the front surface of optical element 102. In addition, optical lens element 102 is also coated with a material having high emissivity at long wavelength IR wavelengths over areas 107B and 107D (area 107D is hidden in FIG. 4) on the back surface of optical element 102. Areas 107A-D are located outside the direct optical path of primary measurement light 103 passing through optical element 102. Also, as depicted in FIG. 4, areas 107A-D are positioned within the field of view of IR camera 101. Thus, thermal images collected by IR camera 101 include the temperatures of areas 107A-D.

Figure 5:
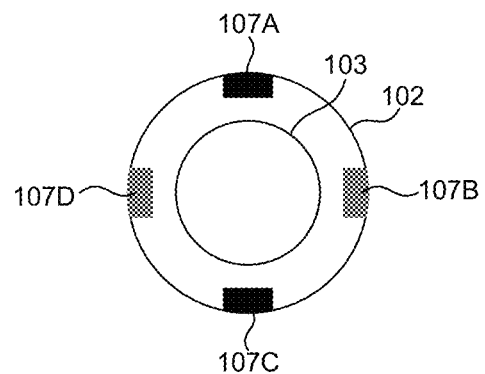
FIG. 5 is a simplified diagram illustrative of the locations of multiple coated areas depicted in FIG. 4 in the field of view of an IR camera.

FIG. 5 illustrates the locations of areas 107A-D in the field of view of IR camera 101. In addition, the perimeter of optical element 102 and the projection of primary measurement light 103 onto optical element 102 are also illustrated. Although four discrete area segments are illustrated in FIG. 5, in general, any number of different area segments, or the entire area outside the direct optical path of primary measurement light 103 may be coated with a material having high emissivity at long IR wavelengths as long as the coated areas on the front surface of lens element 102 do not obscure the coated areas on the back surface of lens element 102 in the field of view of IR camera 101.

In some embodiments, lens element 102 is a VUV optical lens element that is IR transparent. The temperature of a front surface of VUV optical element 102 is measured by IR camera 101 having an unobscured optical path between the IR camera 101 and the front surface of the VUV optic 102. In addition, the temperature of the back surface of the VUV optical element 102 is measured by the same IR camera 101 through the optical element itself. Since the VUV optical element 102 is transparent to IR illumination, measurements can be performed through the lens itself, provided the measurement spots coated with the IR emissive material on the front surface do not obscure the measurement spots coated with the IR emissive material on the back surface in the field of view of the IR camera 101.

In another further aspect, IR imaging based temperature measurements of an optical element are performed through another optical element in the optical system. If the optical components are transparent or reflective to IR illumination, measurements can be performed through multiple optical elements in an optical path of a primary measurement beam, provided the measurement spots coated with IR emissive material do not obscure one another in the field of view of the IR camera. In this manner, temperature measurements of multiple optical elements can be performed simultaneously by a single IR camera system.

Figure 6:
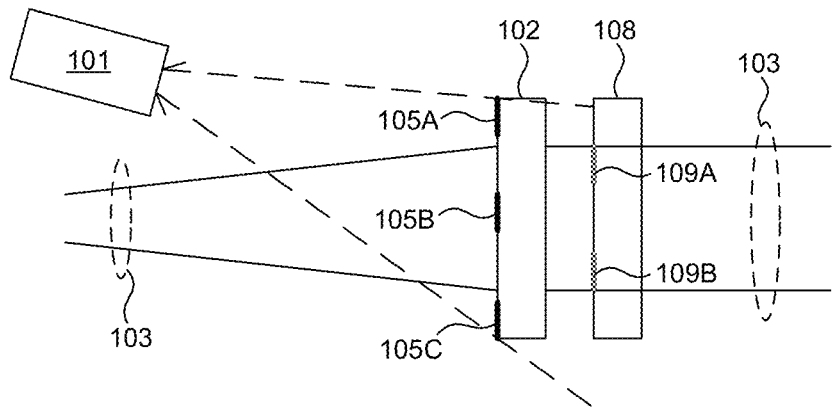
FIG. 6 is a simplified diagram illustrative of two optical lens elements in the optical path of a primary measurement light. Each optical lens element is coated with a material having high emissivity at long IR wavelengths over multiple areas located outside the direct optical path of the primary measurement light passing through both optical elements.

FIG. 6 depicts optical lens elements 102 and 108 in the optical path of primary measurement light 103. Optical lens element 102 is coated with a material having high emissivity at long wavelength IR wavelengths over areas 105A-D. In addition, optical lens element 108 is coated with a material having high emissivity at long wavelength IR wavelengths over areas 109A-D. Areas 105A-D and 109A-D are located outside the direct optical path of primary measurement light 103 passing through optical elements 102 and 108, respectively. Also, as depicted in FIG. 6, areas 105A-D and 109A-D are positioned within the field of view of IR camera 101. Thus, thermal images collected by IR camera 101 include the temperatures of areas 105A-D and 109A-D.

Figure 7:
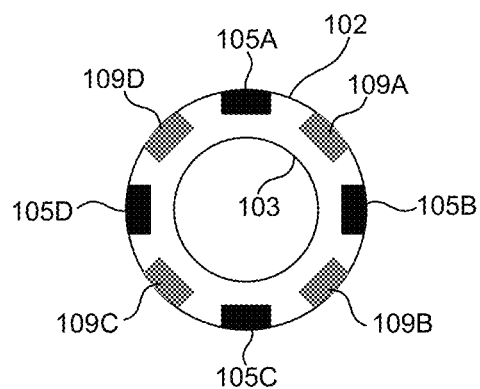
FIG. 7 is a simplified diagram illustrative of the locations of the multiple coated areas depicted in FIG. 6 in the field of view of an IR camera.

FIG. 7 illustrates the locations of areas 105A-D and 109A-D in the field of view of IR camera 101. In addition, the perimeter of optical element 102 and the projection of primary measurement light 103 onto optical element 102 are also illustrated. Although four discrete area segments coated on each lens element are illustrated in FIG. 7, in general, any number of different area segments, or the entire area outside the direct optical path of primary measurement light 103 may be coated with a material having high emissivity at long IR wavelengths as long as the coated areas on the surface of lens element 102 do not obscure the coated areas on the surface of lens element 108 in the field of view of IR camera 101.

In some embodiments, optical elements 102 and 108 are VUV optical elements. The temperature of coated locations on VUV optical element 108 is measured by IR imaging through VUV optical element 102 disposed between the IR camera and VUV optical element 108.

In general, thermal measurements of any number of optical elements can be measured by an IR camera in the manner described herein provided the measurement spots coated with IR emissive material on each optical element do not obscure one another in the field of view of the IR camera and the optical elements themselves are IR-transparent or IR-reflective.

In some embodiments, the coatings of IR emissive material include an oxide material, such as a silicon oxide, an aluminum oxide, etc. In some embodiments, a VUV optical element is coated with the IR emissive material at locations outside the region of the optical element that directly interacts with the primary measurement beam. Subsequently, the VUV optical element is coated with a Calcium Fluoride, Magnesium Fluoride, or Lithium Fluoride coating to achieve the desired VUV optical system performance. In one embodiment, an aluminum oxide coating is applied to an aluminum mirror outside the region of the optical element that directly interacts with the primary measurement beam. Subsequently, the mirror is coated with Magnesium Fluoride, or similar protective coating.

Although the IR emissive material is located outside the direct optical path of the primary measurement beam, stray light derived from the primary measurement beam (e.g., back reflections, etc.) may be absorbed by the IR emissive material, leading to error in temperature measurement. In such a scenario the measured temperature would not just reflect the operating temperature of the optical element in normal operation, but would also reflect incidental heating of the IR emissive material by stray light that would not occur if the IR emissive material were not present on the optical element. In one example, back-reflected VUV illumination light incident on an oxide coating outside the direct optical path of the primary measurement beam causes heating of the oxide coating and increased temperature readings.

In one further aspect, the effect of parasitic heating of the IR emissive material from secondary reflections is removed by adjusting the measured temperature to compensate for the effect (e.g., reduce the measured temperature values to compensate for the increased temperature induced by secondary reflections from the primary measurement beam).

In another further aspect, the shape of one or more optical elements and the locations of the IR emissive material coating on the optical element(s) are optimized to minimize the amount of stray primary measurement light incident on the IR emissive material coatings.

Figure 8:
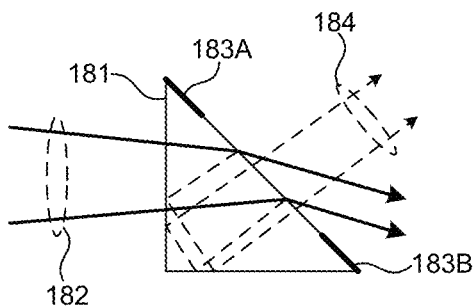
FIG. 8 illustrates a prism element that minimizes the amount of stray primary measurement light incident on the IR emissive materials employed to perform IR temperature measurements as described herein.

FIG. 8 illustrates a prism element 181 that minimizes the amount of stray primary measurement light incident on the IR emissive materials employed to perform IR temperature measurements as described herein. In one example, prism element 181 is employed as a distortion prism used for illumination wavelength selection in a semiconductor measurement system. Primary measurement light 182 passes through prism element 181 and generates secondary reflections 184 that propagate internally within the prism structure before escaping. By locating the IR emissive material 183A-B at locations near the corner of the prism, substantially all of the secondary reflections 184 escape the prism structure without incidence onto areas 183A-B of IR emissive material.

Figure 9:
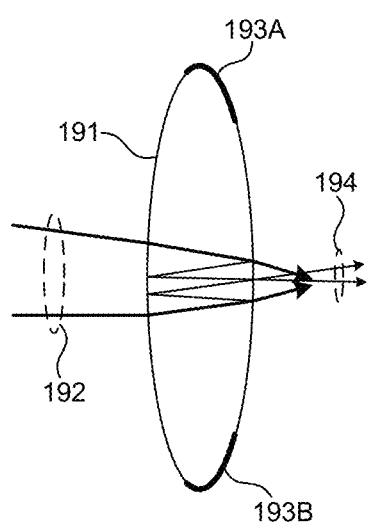
FIG. 9 illustrates a lens element that minimizes the amount of stray primary measurement light incident on the IR emissive materials employed to perform IR temperature measurements as described herein.

FIG. 9 illustrates a lens element 191 that minimizes the amount of stray primary measurement light incident on the IR emissive materials employed to perform IR temperature measurements as described herein. In one example, lens element 191 is employed as a focusing optic used in a semiconductor measurement system. Primary measurement light 192 passes through lens element 191 and generates secondary reflections 194 that propagate internally within the prism structure before escaping. By locating the IR emissive material 193A-B at locations near the periphery of the lens, substantially all of the secondary reflections 194 escape the lens structure without incidence onto areas 193A-B of IR emissive material.

In general, the optical components can be shaped specifically to enhance IR based thermal measurements. Coatings can be positioned to minimize exposure to direct and indirect measurement light (e.g., VUV illumination light) for a particular optical design. In addition, the shape of the optical elements can be optimized to enable IR based thermal measurements by minimizing exposure to direct and indirect measurement light, maximizing visibility to the IR camera, or both.

In another aspect, a semiconductor measurement system includes an IR imaging system to perform IR based temperature measurements of optical elements as described herein.

Figure 10:
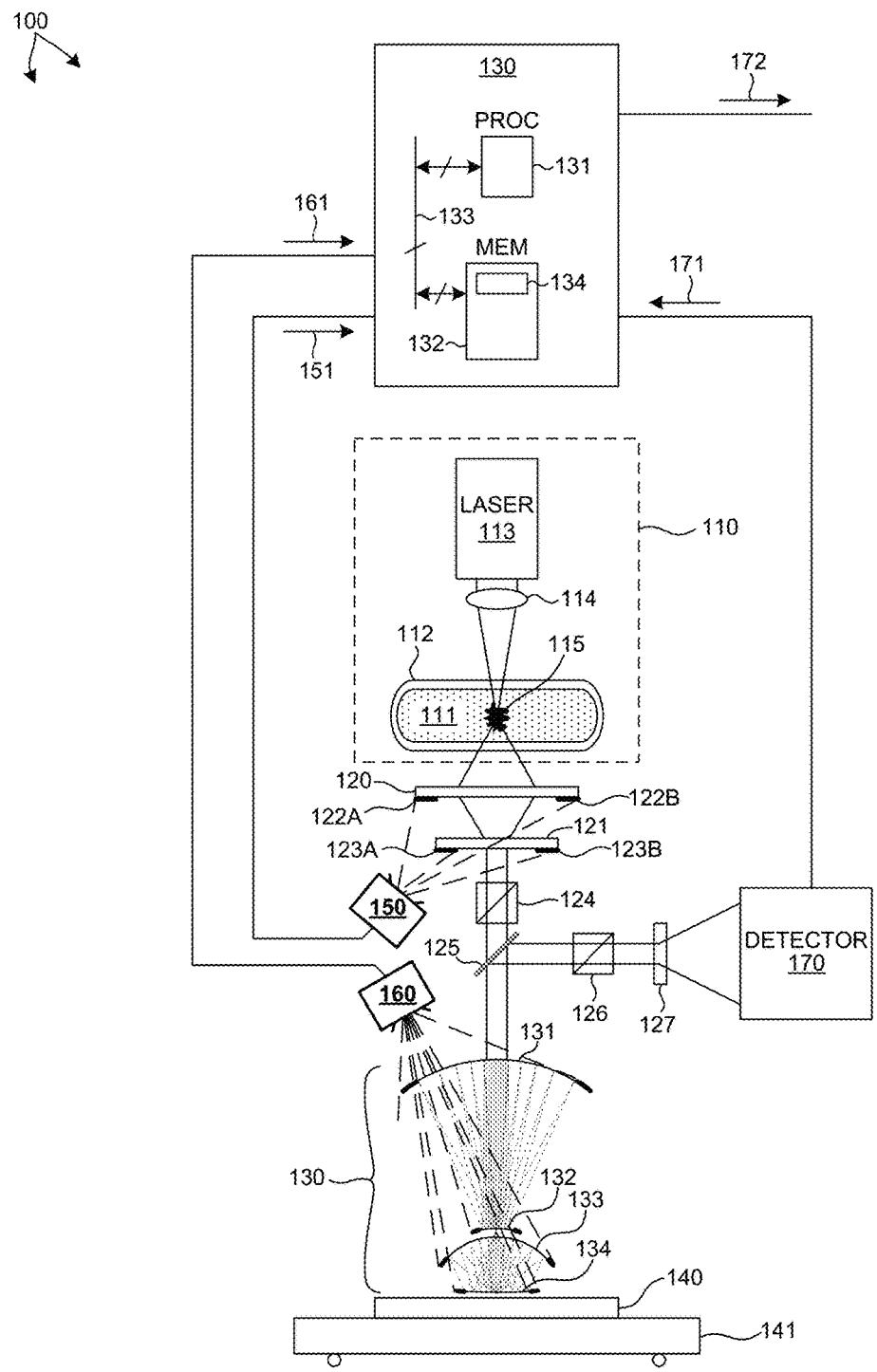
FIG. 10 illustrates an optical measurement system for measuring characteristics of a specimen that employs IR based thermal imaging of optical elements having low IR emissivity as described herein.

FIG. 10 illustrates an optical measurement system 100 for measuring characteristics of a specimen that includes IR based thermal imaging of optical elements with low IR emissivity. As shown in FIG. 10, system 100 may be used to perform optical scatterometry measurements of a specimen 140 disposed on a specimen positioning system 141.

As depicted in FIG. 10, system 100 includes a laser sustained plasma (LSP) illumination source 110 to generate illumination light. In some embodiments, the LSP illumination source 110 is configured to generate wavelengths between 150 nanometers and 2,500 nanometers. LSP illumination sources are capable of producing high-power and high-brightness broadband light suitable for metrology and inspection applications. LSP illumination source 110 includes a laser 113 and focusing optics 114 that focus laser radiation into a working gas 111 contained by a transparent bulb 112. The laser radiation excites the gas 111 into a plasma state that emits light. This effect is typically referred to as "pumping" the plasma with the laser radiation. The plasma bulb 112 is configured to contain the working gas species as well as the generated plasma 115. In some embodiments, LSP illumination source 110 is maintained with an infrared laser pump having a beam power on the order of several kilowatts. The laser beam is focused into a volume of a low or medium pressure working gas 111 contained by plasma bulb 112. The absorption of laser power by the plasma generates and sustains the plasma, for example, at plasma temperatures between 10,000 Kelvin and 20,000 Kelvin.

In the illustrated embodiment, plasma bulb 112 includes a cylindrical shape with spherical ends. In some embodiments, plasma bulb 112 includes any of a substantially spherical shape, a substantially cylindrical shape, a substantially ellipsoidal shape, and a substantially prolate spheroid shape. These shapes are provided by way of non-limiting example. However, many other shapes may be contemplated. Plasma bulb 112 is substantially transparent to at least a portion of the laser pump light and is also substantially transparent to at least a portion of the collectable illumination (e.g., IR light, visible light, ultraviolet light) emitted by the plasma 115 sustained within the plasma bulb 112.

It is contemplated herein that a refillable plasma bulb 112 may be utilized to sustain a plasma in a variety of gas environments. In one embodiment, the working gas 111 of the plasma bulb 112 may include an inert gas (e.g., noble gas or non-noble gas) or a non-inert gas (e.g., mercury) or their mixtures. In general, the plasma bulb 130 may be filled with any gas known in the art suitable for use in laser sustained plasma light sources. In addition, the working gas may include a mixture of two or more gases. By way of non-limiting example, the working gas may include any one or combination of Ar, Kr, Xe, He, Ne, N2, Br2, Cl2, I2, H2O, O2, H2, CH4, NO, NO2, CH3OH, C2H5OH, CO2, NH3 one or more metal halides, a Ne/Xe mixture, an Ar/Xe mixture, a Kr/Xe mixture, an Ar/Kr/Xe mixture, an ArHg mixture, a KrHg mixture, and a XeHg mixture. In general, the present invention should be interpreted to extend to any light pumped plasma generating system and should further be interpreted to extend to any type of working gas suitable for sustaining a plasma within a plasma bulb.

Beam shaping optics 120 and 121 shape and direct incident illumination light through polarizer 124. In the depicted embodiment, beam shaping optics 120 and 121 collimate the illumination light generated by the LSP illumination source 110. In some embodiments, beam shaping optics 120 and 121 include one or more collimating mirrors, apertures, monochromators, and beam stops, multilayer optics, refractive optics, diffractive optics such as zone plates, or any combination thereof.

In the depicted embodiment, the collimated illumination light passes through polarizer 124. In some embodiments, polarizer 124 is configured to selectively rotate a polarizing element about the optical axis of the illumination light beam. In general, polarizer 124 may include any polarizing element and system to rotate the polarizing element known in the art. For example, the polarizer 124 may include a polarizing element mechanically coupled to a rotational actuator. In one example, the polarizing element may be a Rochon prism. In another example, the polarizing element may include a beam displacer. Polarizer 124 is configured to operate within system 100 in either a rotationally active or rotationally inactive state. In one instance, a rotational actuator of polarizer 124 may be inactive such that the polarizing element remains rotationally fixed about the optical axis of the illumination light beam. In another instance, the rotational actuator may rotate the polarizing element at a selected angular frequency, $\omega_p$, about the optical axis of the illumination light. In some other embodiments, polarizer 124 is configured with a fixed polarization angle about the optical axis of the illumination light beam.

As depicted in FIG. 10, polarizer 124 generates a polarized light beam directed toward beamsplitter 125. Beamsplitter 125 directs the polarized light beam towards objective 130. In the embodiment depicted in FIG. 10, objective 130 is arranged in a four mirror, four pass configuration including reflective optical elements only. Objective 130 includes mirrors 131-134 that focus the illumination light (i.e., the primary measurement light) onto the surface of wafer 140. The illumination light is focused onto the surface of wafer 140 over a range of angles of incidence. The interaction of the focused, polarized illumination light with wafer 140 modifies the polarization of the radiation by any of reflection, scattering, diffraction, transmission, or other types of processes. After interaction with the wafer 140, the modified light is collected by objective 130 and directed to beamsplitter 125. Beamsplitter 125 is configured to transmit the modified light toward polarizer 126. In the embodiment depicted in FIG. 10, polarizer 126 includes a polarizer element that remains rotationally fixed about the optical axis of the modified light beam as the beam passes through the polarizer 126 to dispersion element 127 and detector 170 of a spectrometer. In the spectrometer, the beam components having different wavelengths are refracted (e.g., in a prism spectrometer) or diffracted (e.g., in a grating spectrometer) in different directions to one or more detector elements of detector 170. The detectors may be a linear array of photodiodes, with each photodiode measuring radiation in a different wavelength range. The radiation received by the spectrometer is analyzed with regard to polarization state, allowing for spectral analysis by the spectrometer of radiation passed by the polarizer 126. The detected spectra 171 are passed to computing system 130 for analysis of the structural characteristics of wafer 140.

Detector 170 collects radiation from wafer 140 and generates a output signals 171 indicative of properties of specimen 140 that are sensitive to the incident illumination light. Detector 170 is able to resolve one or more photon energies and produces signals for each energy component indicative of properties of the specimen. In some embodiments, the detector 170 includes any of a CCD array, a photodiode array, a CMOS detector, and a photomultiplier tube. In some embodiments, detector 170 is a wavelength dispersive detector, for example, in embodiments of system 100 implementing wavelength dispersive metrology. In some other embodiments, detector 170 is an energy dispersive detector, for example, in embodiments of system 100 implementing energy dispersive metrology.

In another aspect, system 100 includes IR camera systems 150 and 160 that perform thermal imaging of multiple optical elements of system 100. As depicted in FIG. 10, IR camera 150 is positioned such that portions of optical elements 120 and 121 coated with an IR emissive material are within the field of view of IR camera 150. For example, areas 122A and 122B of optical element 120 are coated with an IR emissive material, and areas 123A and 123B of optical element 121 are coated with an IR emissive material. IR images 151 collected by IR camera 150 are communicated to computing system 130 for analysis of the temperature distribution of optical elements 120 and 121. Similarly, IR camera 160 is positioned such that portions of optical elements 131-134 coated with an IR emissive material are within the field of view of IR camera 160. Furthermore, the areas of IR emissive material are located such that they do not obscure one another in the field of view of each respective IR camera. IR images 161 collected by IR camera 160 are communicated to computing system 130 for analysis of the temperature distribution of optical elements 131-134.

System 100 also includes a computing system 130 employed to acquire signals 171 generated by detector 170, and determine properties of the specimen based at least in part on the acquired signals. In a further embodiment, computing system 130 is configured to access model parameters in real-time, employing Real Time Critical Dimensioning (RTCD), or it may access libraries of pre-computed models for determining a value of at least one specimen parameter value associated with the specimen 140.

As illustrated in FIG. 10, system 100 includes a specimen positioning system 141 configured to both align and orient specimen 140 with respect the illumination source 110 and detector 170 of system 100. Computing system 130 communicates command signals (not shown) to a motion controller of specimen positioning system 141 that indicates the desired position of specimen 140. In response, the motion controller generates command signals to the various actuators of specimen positioning system 141 to achieve the desired positioning of specimen 140.

In one further aspect, computing system 130 is configured to receive thermal images collected by IR cameras 150 and 160. Computing system 130 is further configured to estimate the temperature distribution of each of the optical elements imaged by the IR cameras 150 and 160 based on the received thermal images. In some embodiments, computing system 130 is further configured to estimate the total amount of primary measurement light absorbed by each of the optical elements imaged by the IR cameras 150 and 160 based on the received thermal images. In one example, the amount of light absorbed by one or more of the optical elements is indicative of the spectrum of the primary illumination light. In another example, the amount of light absorbed by one or more of the optical elements is indicative of the transmission efficiency of an optical element for VUV spectra close to or below the absorption edge of the materials employed to construct the optical element (e.g., close to 120 nanometers).

In another further aspect, computing system 130 is configured to estimate the magnitude of damage to an optical element based on the received thermal images. A damaged optical element will exhibit higher temperatures and different temperature distribution characteristics. In this manner, the received thermal images are indicative of the health of the optical element.

In another further aspect, computing system 130 is configured to estimate the intensity of the primary illumination light based on the measured temperature profile of the absorptive optical element, or group of optical elements. In one example, the intensity of VUV illumination light is estimated in this manner without incurring additional light losses that would be necessary to perform the measurement in a conventional manner.

It should be recognized that the various steps described throughout the present disclosure may be carried out by a single computer system 130 or, alternatively, a multiple computer system 130. Moreover, different subsystems of the system 100, such as the specimen positioning system 140, IR cameras 150 and 160, or detector 170, may include a computer system suitable for carrying out at least a portion of the steps described herein. Therefore, the aforementioned description should not be interpreted as a limitation on the present invention but merely an illustration. Further, the one or more computing systems 130 may be configured to perform any other step(s) of any of the method embodiments described herein.

In addition, the computer system 130 may be communicatively coupled to the IR cameras 150 and 160 in any manner known in the art. For example, the one or more computing systems 130 may be coupled to computing systems associated with the IR cameras 150 and 160, respectively. In another example, any of the detector 170 and IR cameras 150 and 160, may be controlled directly by a single computer system coupled to computer system 130.

The computer system 130 of the system 100 may be configured to receive and/or acquire data or information from the subsystems of the system (e.g., detector 170, IR cameras 150 and 160, and the like) by a transmission medium that may include wireline and/or wireless portions. In this manner, the transmission medium may serve as a data link between the computer system 130 and other subsystems of the system 100.

Computer system 130 of the system 100 may be configured to receive and/or acquire data or information (e.g., temperature measurement results, modeling inputs, modeling results, etc.) from other systems by a transmission medium that may include wireline and/or wireless portions. In this manner, the transmission medium may serve as a data link between the computer system 130 and other systems (e.g., memory on-board system 100, external memory, or external systems). For example, the computing system 130 may be configured to receive measurement data (e.g., signals 151, 161, and 171) from a storage medium (i.e., memory 132) via a data link. For instance, temperature measurement results obtained using IR cameras 150 and 160 may be stored in a permanent or semi-permanent memory device (e.g., memory 132). In this regard, the temperature measurement results may be imported from on-board memory or from an external memory system. Moreover, the computer system 130 may send data to other systems via a transmission medium. For instance, temperature distributions determined by computer system 130 may be stored in a permanent or semi-permanent memory device (e.g., an external memory). In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 10, program instructions stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

As described with reference to FIG. 10, system 100 includes an optical scatterometer system. However, in general, temperature measurements of optical elements associated with one or more different metrology or inspection techniques may be contemplated within the scope of this patent document.

In general, the temperature measurements described herein provide useful performance feedback for a wide range of optical metrology and inspection systems. The temperature measurement techniques described herein can improve the performance of Spectroscopic Ellipsometry (SE), Spectroscopic Reflectometry (SR), and Beam-Profile Reflectometry (BPR) systems used in film, critical dimension (CD), and composition metrology. Furthermore, the temperature measurement techniques described herein can improve the performance of wafer and mask inspection systems employed to detect defects of various types and sizes.

By way of non-limiting example, any of the following optical metrology techniques including, spectroscopic ellipsometry (including Mueller matrix ellipsometry), Mueller matrix spectroscopic ellipsometry, spectroscopic reflectometry, spectroscopic scatterometry, scatterometry overlay, beam profile reflectometry, (angle and polarization resolved), beam profile ellipsometry, single or multiple discrete wavelength ellipsometry, multiple angle of incidence ellipsometry, and spectroscopic polarimetry may be contemplated within the scope of this patent document.

Metrology techniques as described herein may be used to determine characteristics of semiconductor structures. Exemplary structures include, but are not limited to, Fin-FETs, low-dimensional structures such as nanowires or graphene, sub 10 nm structures, thin films, lithographic structures, through silicon vias (TSVs), memory structures such as DRAM, DRAM 4F2, FLASH and high aspect ratio memory structures, such as 3D-NAND structures. Exemplary structural characteristics include, but are not limited to, geometric parameters such as line edge roughness, line width roughness, pore size, pore density, side wall angle, profile, film thickness, critical dimension, pitch, and material parameters such as electron density, crystalline grain structure, morphology, orientation, stress, strain, elemental identification, and material composition.

In some embodiments, the temperature measurement techniques described herein may be implemented as part of a fabrication process tool. Examples of fabrication process tools include, but are not limited to, lithographic exposure tools, film deposition tools, implant tools, and etch tools. In this manner, the results of the temperature measurements are used to control a fabrication process.

Figure 11:
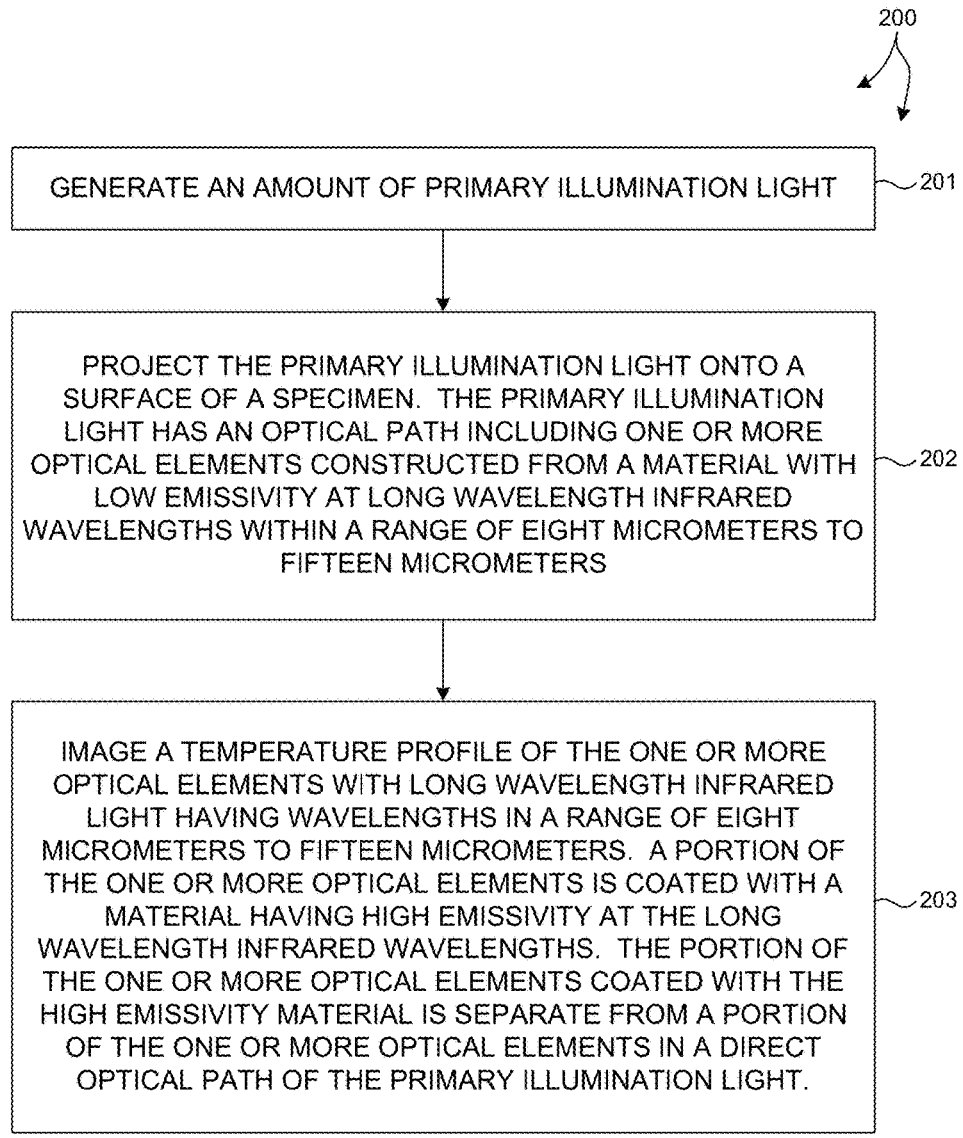
FIG. 11 is a flowchart illustrative of one exemplary method 200 suitable for imaging a temperature profile of one or more optical elements of a measurement system with long wavelength infrared light.

FIG. 11 illustrates a method 200 suitable for generating thermal images of optical elements in accordance with at least one inventive aspect. It is recognized that data processing elements of method 200 may be carried out via a pre-programmed algorithm stored as part of program instructions 134 and executed by one or more processors of computing system 130. While the following description is presented in the context of system 100 depicted in FIG. 10, it is recognized herein that the particular structural aspects of system 100 do not represent limitations and should be interpreted as illustrative only.

In block 201, an amount of primary illumination light is generated by an illumination source.

In block 202, the primary illumination light is projected onto a surface of a specimen. The primary illumination light has an optical path including one or more optical elements constructed from a material with low emissivity at long wavelength infrared wavelengths within a range of eight micrometers to fifteen micrometers.

In block 203, a temperature profile of the one or more optical elements is imaged with long wavelength infrared light having wavelengths in a range of eight micrometers to fifteen micrometers. A portion of the one or more optical elements is coated with a material having high emissivity at the long wavelength infrared wavelengths. The portion of the one or more optical elements coated with the high emissivity material is separate from a portion of the one or more optical elements in a direct optical path of the primary illumination light.

In another aspect, infrared light having wavelengths greater than 11 micrometers is employed to measure temperature of optical elements of a metrology or inspection system. In some embodiments, the optical components exhibit some emissivity. For example, glass lenses exhibit high emissivity, some reflectivity, but substantially no transmission of light having wavelengths greater than 11 micrometers. In these embodiments, the temperature profile of the optical element can be imaged based on the entire optic, or large portions of the optic because the temperature probe light can coincide with the direct optical path of the primary measurement light employed by the metrology system itself to perform measurements of a specimen.

As used herein, the term "vacuum ultraviolet light" or "VUV light" refers to ultraviolet light that will be significantly absorbed by air, oxygen, carbon dioxide, and water molecules. VUV light generally includes light having a wavelength of less than about 190 nm. The term "non-vacuum ultraviolet light" or "non-VUV light" refers to deep ultraviolet light, ultraviolet light, visible light, infrared light, or any combination thereof. Generally, the term non-VUV light refers to any light having a wavelength greater than about 190 nm. In addition, the term "near vacuum ultraviolet light" or "near VUV light" is used to refer to light having a wavelength of about 190 nm to about 200 nm (e.g., about 193 nm), which is partially transmissive in the atmosphere. VUV light, non-VUV light, and near VUV light may be monochromatic, near monochromatic, polychromatic, or broadband light.

Various embodiments are described herein for a semiconductor processing system (e.g., an inspection system, a metrology system, or a lithography system) that may be used for processing a specimen. The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as quartz. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An apparatus, comprising:
   a first optical element disposed in an optical path of an amount of primary measurement light of an optically based measurement system, wherein the amount of primary measurement light is incident on the first optical element over a first portion of the first optical element, wherein the first optical element is constructed of a material with low emissivity at long wavelength infrared wavelengths within a range of eight micrometers to fifteen micrometers;
   a first amount of material having high emissivity at the long wavelength infrared wavelengths disposed on the first optical element over a second portion of the first optical element that is separate from the first portion of the first optical element; and
   an infrared camera system configured to perform IR-based temperature measurements of the first optical element with long wavelength infrared light having wavelengths in a range of eight micrometers to fifteen micrometers, wherein the second portion of the first optical element is in the field of view of the infrared camera system.

2. The apparatus of claim 1, wherein the first optical element substantially transmits or substantially reflects long wavelength infrared light having wavelengths in the range of eight micrometers to fifteen micrometers.

3. The apparatus of claim 1, further comprising:
   a second optical element disposed in the optical path of the amount of primary measurement light, wherein the amount of primary measurement light is incident on the second optical element over a first portion of the second optical element, wherein the second optical element is constructed of a material with low emissivity at long wavelength infrared wavelengths within a range of eight micrometers to fifteen micrometers;
   a second amount of material having high emissivity at the long wavelength infrared wavelengths disposed on the second optical element over a second portion of the second optical element that is separate from the first area of the second optical element, wherein the second portion of the second optical element is in the field of view of the infrared camera system, and wherein the infrared camera system is further configured to perform IR temperature measurements of the second optical element with the long wavelength infrared light.

4. The apparatus of claim 3, wherein the long wavelength infrared light is transmitted through the first optical element to the second portion of the second optical element.

5. The apparatus of claim 1, wherein the second portion of the first optical element includes a portion of a front surface of the first optical element that is not in the optical path of the amount of primary measurement light and a portion of a back surface of the first optical element that is not in the optical path of the amount of primary measurement light.

6. The apparatus of claim 1, wherein the material having high emissivity at the long wavelength infrared wavelengths is an oxide material.

7. The apparatus of claim 1, wherein a shape of the first optical element is optimized to minimize an amount of stray light from the primary measurement light that is incident on the second portion of the first optical element.

8. The apparatus of claim 1, further comprising:
   a computing system configured to estimate an intensity of the amount of primary measurement light based on the IR-based temperature measurements performed by the infrared camera system.

9. A measurement system, comprising:
   an illumination source configured to generate an amount of primary illumination light;

an illumination optics subsystem configured to project the primary illumination light onto a surface of a specimen, the illumination optics subsystem including:
  a first optical element disposed in an optical path of the amount of primary measurement light, wherein the amount of primary measurement light is incident on the first optical element over a first portion of the first optical element, wherein the first optical element is constructed of a material with low emissivity at long wavelength infrared wavelengths within a range of eight micrometers to fifteen micrometers;
  a first amount of material having high emissivity at the long wavelength infrared wavelengths disposed on the first optical element over a second portion of the first optical element that is separate from the first area of the first optical element; and
  an infrared camera system configured to perform IR-based temperature measurements of the first optical element with long wavelength infrared light having wavelengths in a range of eight micrometers to fifteen micrometers, wherein the second portion of the first optical element is in the field of view of the infrared camera system.

10. The measurement system of claim 9, wherein the first optical element substantially transmits or substantially reflects long wavelength infrared light having wavelengths in the range of eight micrometers to fifteen micrometers.

11. The measurement system of claim 9, the illumination optic subsystem further comprising:
  a second optical element disposed in the optical path of the amount of primary measurement light, wherein the amount of primary measurement light is incident on the second optical element over a first portion of the second optical element, wherein the second optical element is constructed of a material with low emissivity at long wavelength infrared wavelengths within a range of eight micrometers to fifteen micrometers;
  a second amount of material having high emissivity at the long wavelength infrared wavelengths disposed on the second optical element over a second portion of the second optical element that is separate from the first area of the second optical element, wherein the second portion of the second optical element is in the field of view of the infrared camera system, and wherein the infrared camera system is further configured to perform IR temperature measurements of the second optical element with the long wavelength infrared light.

12. The measurement system of claim 11, wherein the long wavelength infrared light is transmitted through the first optical element to the second portion of the second optical element.

13. The measurement system of claim 11, wherein the second portion of the first optical element includes a portion of a front surface of the first optical element that is not in the optical path of the amount of primary measurement light and a portion of a back surface of the first optical element that is not in the optical path of the amount of primary measurement light.

14. The measurement system of claim 9, wherein the material having high emissivity at the long wavelength infrared wavelengths is an oxide material.

15. The measurement system of claim 9, further comprising:
  a computing system configured to estimate an intensity of the amount of primary measurement light based on the IR-based temperature measurements performed by the infrared camera system.

16. A method comprising:
generating an amount of primary illumination light;
projecting the primary illumination light onto a surface of a specimen, the primary illumination light having an optical path including one or more optical elements constructed from a material with low emissivity at long wavelength infrared wavelengths within a range of eight micrometers to fifteen micrometers; and
imaging a temperature profile of the one or more optical elements with long wavelength infrared light having wavelengths in a range of eight micrometers to fifteen micrometers, wherein a portion of the one or more optical elements is coated with a material having high emissivity at the long wavelength infrared wavelengths, wherein the portion of the one or more optical elements coated with the high emissivity material is separate from a portion of the one or more optical elements in a direct optical path of the primary illumination light.

17. The method of claim 16, further comprising:
estimating a temperature distribution of each of the one or more optical elements based on the measured temperature profile.

18. The method of claim 16, further comprising:
estimating an amount of the primary measurement light absorbed by each of the one or more optical elements based on the measured temperature profile.

19. The method of claim 16, further comprising:
estimating a magnitude of damage to the one or more optical elements based on the measured temperature profile.

20. The method of claim 16, further comprising:
estimating an intensity of the primary illumination light based on the measured temperature profile of the one or more optical elements.

* * * * *